C. D. BEAN.
HORSESHOE-MACHINE.
No. 178,503. Patented June 13, 1876.
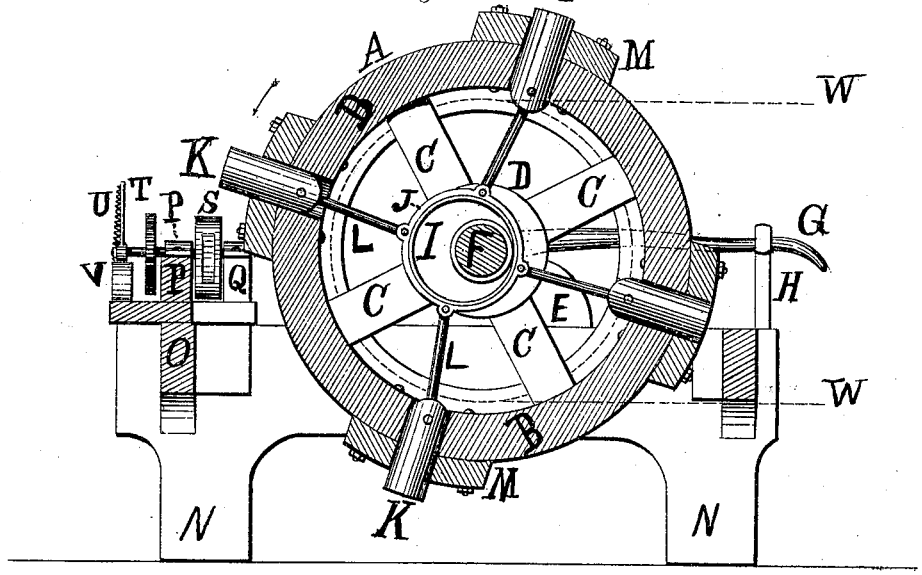
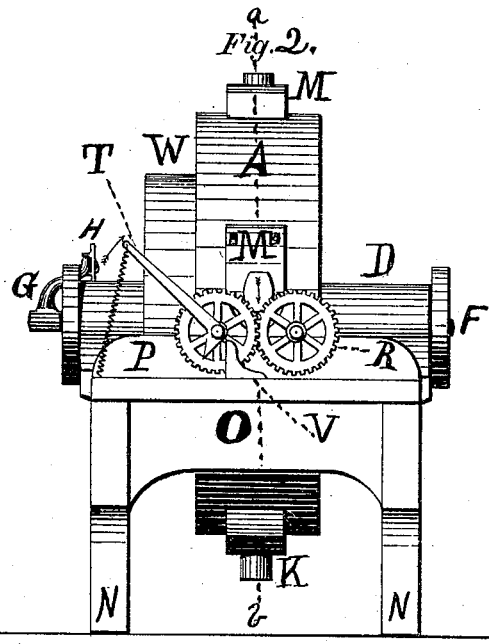
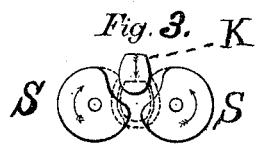
Attest:
Clara J. Clark
Chas. H. Conner
Inventor:
Cyrus D. Bean
per E. B. Stocking
atty

UNITED STATES PATENT OFFICE.

CYRUS D. BEAN, OF SKANEATELES, NEW YORK.

IMPROVEMENT IN HORSESHOE-MACHINES.

Specification forming part of Letters Patent No. 178,503, dated June 13, 1876; application filed November 29, 1875.

*To all whom it may concern:*

Be it known that I, CYRUS D. BEAN, of the town of Skaneateles, county of Onondaga, and State of New York, have invented new and useful Improvements in Horseshoe-Machines; and that the following is a full, clear, and exact description thereof, reference being had to the drawing herein, in which—

Figure 1 is a vertical longitudinal section, through the line *a b* on Fig. 2, and Fig. 2 is an end elevation; and Fig. 3 represents a detail.

Like letters represent like parts in the drawing.

In the drawing, A is a wheel, made of a rim, B, and two sets of spiders, C, extending from the outside of the rim to the inner ends of the hollow journals D D, which revolve in journal-boxes E E, supported by any suitable frame, N. Through the center of the journals D D is a shaft, F, rigidly attached to a lever, G, the free end of which is detachably held by the spring-catch H. Upon the shaft F, and between the hollow journals D D, is rigidly attached an eccentric, I. Around this eccentric a strap, J, rides freely, to which are connected formers K by means of arms L, in such a way that the formers may easily advance and retire through orifices in the rim B, and through former-blocks M, detachably fastened to the outer surface of the rim B, in any suitable manner. The orifice in the rim is large enough to admit formers of different sizes. The formers and former-blocks and revolving cams S are made in sets, and are detachable, that other such parts may be substituted for any which are damaged, or other sizes of such parts placed in the wheel, to manufacture shoes of different sizes and shapes. At the front end of the machine, on the cross-piece O, are placed bearings P Q for the axles of the gear-wheels R, upon which axles, and between the bearings P Q, are attached the revolving cams S S, each of which has, in that part of its periphery which is shaped like the outside of one-half of a completed horseshoe, a mold or female die of that form at its bottom which the completed horseshoe is to possess wherever it is compressed by each mold. The bearing P extends across the cross-bar O, while the middle of the bearing Q opposite the center of the rim B is entirely cut away. Beneath this cut a recess is made in bar O. To the axle of one or both of the gear-wheels R is rigidly fixed a lever, T, whose free end is attached to the cross-bar O by means of the spring U. V is a stop for the lever T. W is a belt or gear wheel upon the side of the wheel A, for the application of power to the machine.

The operation of the machine is as follows: The gear-wheels R having been set to bring the mold-faces of the revolving cams into nearly the same horizontal line, a horseshoe-blank is laid upon them, the center of the blank being opposite the center of the rim B of the wheel A. The power is then applied to revolve the wheel A and its hollow journals around the stationary shaft F and its stationary eccentric I, which is so set on the shaft that it projects each former outside of the rim and former-block as it approaches the shoe-blank resting upon the revolving mold-faces of the cams. The strap J slides around the eccentric. The wheel continuing to revolve, the former strikes the blank at its center, bends the blank centrally downward and outward into the heel-narrowing molds formed in the cam-surfaces, and forces the cams to revolve inwardly toward each other, and to press the ends of the shoe-blank into the required shape against the former, as shown in the lower dotted lines of Fig. 3. The blank is thus changed from a straight bar into a complete horseshoe shape, narrowed horizontally at the heels, if desired. It is seen that the molds, during the first portion of their operation, merely hold and bend the blank and compress it against the former; but when they begin to bend and compress the blank near its ends, then they also form the heels by narrowing them in the direction of their horizontal cross-section. When the advancing former carries the blank entirely through between the revolving cams, the revolution of the wheel A continuing, and the rim B carrying the former, it is gradually withdrawn inwardly and from the clasp of shoe by the eccentric, and the shoe is delivered from the machine. At a half-revolution of the wheel the former is entirely indrawn, and at a complete revolution is again projected, to form another blank. The formers may be operated, whenever required, without revolving the wheel A, by revolving the lever G, for the purpose of withdrawing a former from partially-formed blanks which are imperfect or misplaced. Such a blank is thus prevented from passing completely through between the revolving cams. The former can be withdrawn from a blank whether the wheel A be revolving or at rest. Each one of the former-arms L may be attached to a separate strap about the eccentric I. It is obvious that the rim B may have any required width of periphery capable of accommodating several series of formers, each series having its set of revolving cams; also, that one set of revolving cams may be made to traverse to successively serve the formers of every series. The revolving cams may have several molds on their peripheries, and, instead of being returned to their original position by the lever and spring, may, by completely revolving, present successive molds to successive formers.

What I claim as my invention, and wish to secure by Letters Patent, is—

1. The combination of a wheel having an apertured rim with one or more advancing and receding formers, an eccentric, and a non-revolving shaft, as and for the purpose described.

2. The combination of a wheel having an apertured rim and hollow journals with a non-revolving shaft, provided with means for projecting and withdrawing one or more formers, as and for the purpose described.

3. The combination of a wheel having an apertured rim and hollow journals with a central shaft, provided with means for operating one or more formers by the revolution of the central shaft, as and for the purpose described.

4. The combination of a wheel having an apertured rim and hollow journals with a central shaft, provided with means for operating one or more formers by the revolution of the wheel, and also with independent means of operating one or more formers by the revolution of the shaft, as and for the purpose described.

5. The combination of revolving cams, having heel-narrowing molds on their opposing faces, with one or more formers attached to a revolving perimeter, the cams being actuated by the former or formers, whereby the bending and the final shaping of the heels, as described, are effected at one operation.

6. The combination of revolving cams, having heel-forming molds on their opposing faces, with one or more advancing and receding formers and a revolving rim, as and for the purpose described.

7. The combination of the wheel A, having apertured rim B, hollow journals D, eccentric I, straps J, arms L, and former or formers K, as and for the purpose described.

8. The combination of wheel A, having apertured rim B, hollow journals D, shaft F, eccentric I, straps J, arms L, former or formers K, and supported lever G, as and for the purpose described.

9. Revolving cams, having bending and heel-narrowing molds sunk in opposing portions of their perimeters, whereby a blank is continuously bent and the heels narrowed horizontally, as described.

10. The combination of revolving cams, having bending and heel-narrowing molds sunk in opposing portions of their perimeters, with geared wheels, as and for the purpose described.

11. The combination of revolving cams, having bending and heel-narrowing molds sunk in opposing portions of their perimeters, geared wheels, a lever, and a retractile spring, as and for the purpose described.

12. The combination of the rim B, detachable former K, detachable former-block M, and detachable cams S, as and for the purpose described.

CYRUS D. BEAN.

Witnesses:
E. B. STOCKING,
A. E. JONES.